United States Patent [19]

Odawara

[11] Patent Number: 4,476,907
[45] Date of Patent: Oct. 16, 1984

[54] ANTISKID DEVICE FOR TIRE

[76] Inventor: Chuichiro Odawara, 49-1, Kamiikarida, Naganawashiro, Hachinoe-City, Aomori-Prefecture, Japan

[21] Appl. No.: 452,948

[22] Filed: Dec. 27, 1982

[30] Foreign Application Priority Data

Dec. 28, 1981 [JP] Japan ............................ 56-193059[U]
Jan. 9, 1982 [JP] Japan ................................ 57-893[U]

[51] Int. Cl.³ ............................................. B60C 27/06
[52] U.S. Cl. ............................. 152/179; 24/68 TT;
24/69 TT; 81/15.8; 152/182; 152/189;
152/220; 152/225 R; 152/225 C; 152/228;
152/242; 180/183
[58] Field of Search ............... 152/231, 239, 242, 223,
152/217, 225 R, 225 C, 240, 241, 213 A, 216,
213 R, 219, 170, 178, 179, 180, 182–185, 185.1,
189, 220, 228; 24/69 CT, 70 TT, 71 T, 71 TT,
68 TT, 68 CD, 69 TT; 81/15.8; 180/9, 26, 183;
305/19, 53; 301/42, 44 R

[56] References Cited

U.S. PATENT DOCUMENTS

| | | | |
|---|---|---|---|
| 1,350,069 | 8/1920 | Corseplus | 180/183 |
| 1,864,869 | 6/1932 | Squier | 152/242 |
| 1,935,035 | 11/1933 | Levi | 152/213 A |
| 1,952,944 | 3/1934 | Ruffertshofer | 152/223 |
| 2,008,210 | 7/1935 | Hipkins | 152/220 |
| 2,198,478 | 4/1940 | Hewel | 152/241 |
| 2,248,420 | 7/1941 | Bland | 152/220 |
| 2,440,632 | 4/1948 | Hack | 152/225 R |
| 2,537,440 | 1/1951 | Bradstreet | 81/15.8 |
| 2,607,388 | 8/1952 | Skovran | 152/228 |
| 2,608,234 | 8/1952 | Hughes | 81/15.8 X |
| 3,002,545 | 10/1961 | Newcomb | 152/225 R |

Primary Examiner—William A. Powell
Assistant Examiner—Thomas Bokan
Attorney, Agent, or Firm—Kane, Dalsimer, Kane, Sullivan and Kurucz

[57] ABSTRACT

An antiskid device and its fittings for a tire including a side chain, a cross chain, a connector, an end link, a hook and a stopper. The side chain includes a side link formed as a two-piece link having two links, one a long link and the other a short link, which are integral with each other. The stopper is angled in transverse cross section and formed with a transverse web of a width large enough to contact a lower portion of the end link and a groove of a width large enough to receive the hook. The cross chain is formed as a cross link of bar material, and the connector is in the form of a link on either end and in the form of a rod in its intermediate portion so that the connector is connected at one end to the cross link and at the other end to the side link.

12 Claims, 82 Drawing Figures

FIG. 4b  FIG. 4c  FIG. 4d
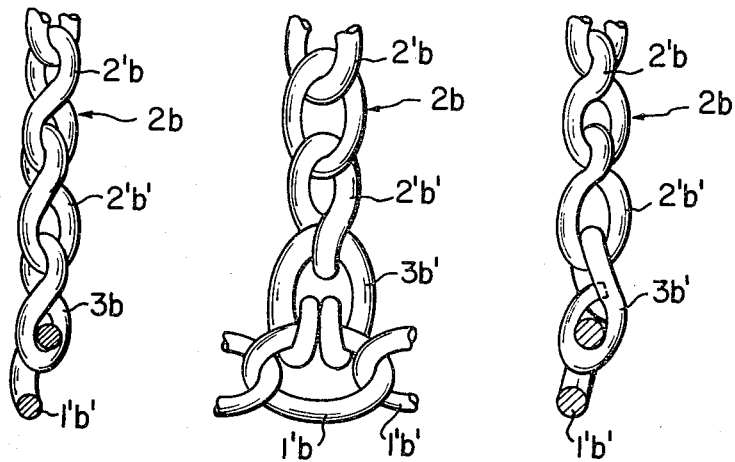
FIG. 4e  FIG. 4f
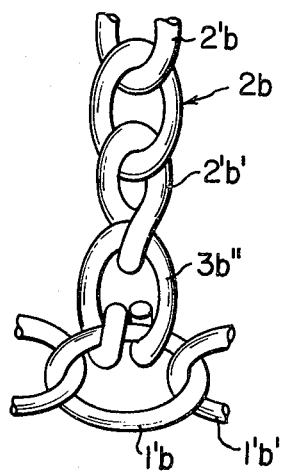  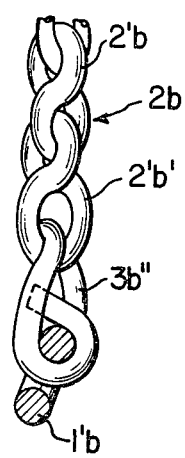

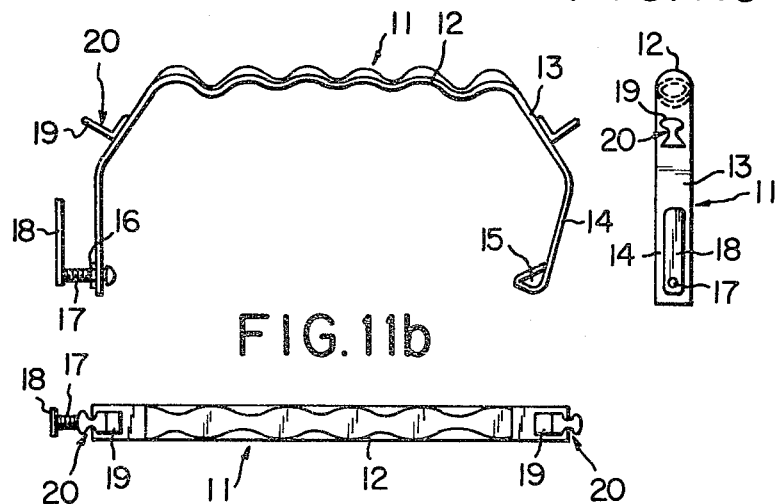
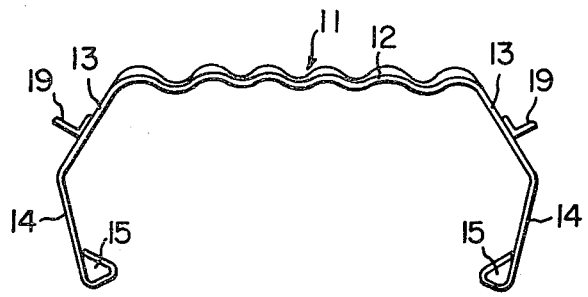

FIG.15a
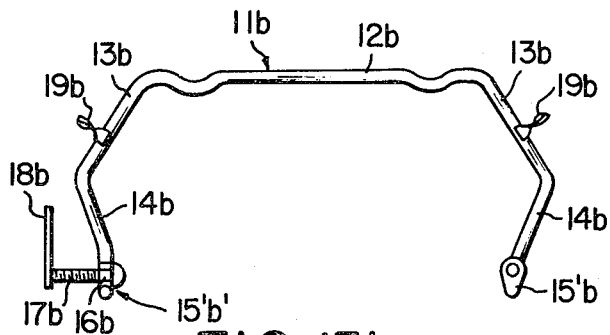
FIG.15b
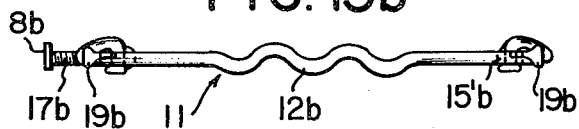
FIG.15c   FIG.15d
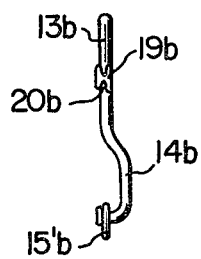 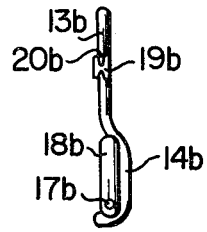

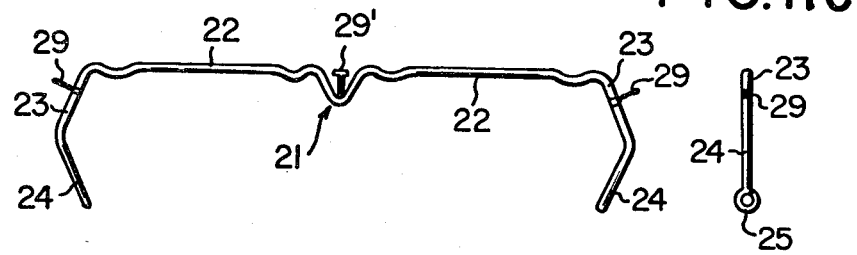
FIG.17a
FIG.17c
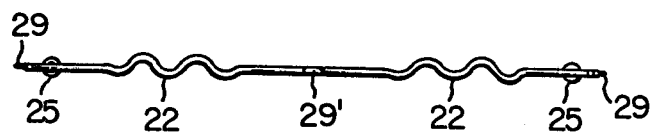
FIG.17b

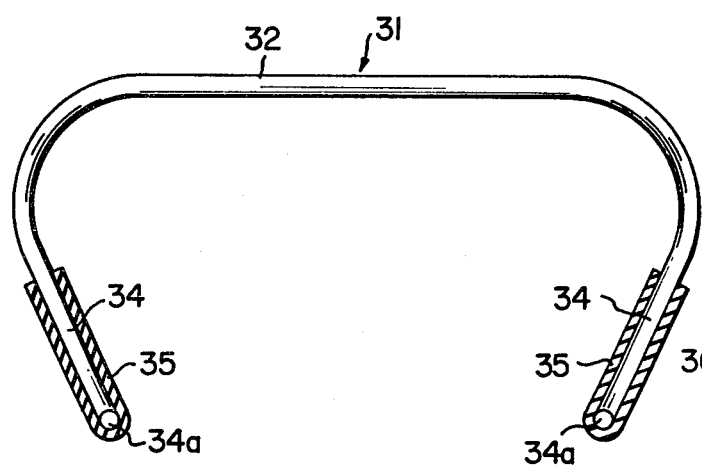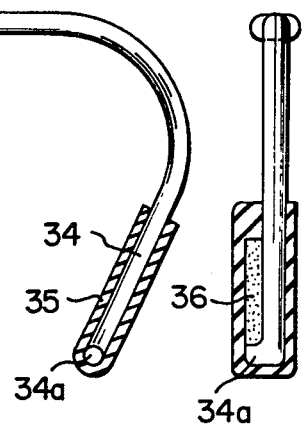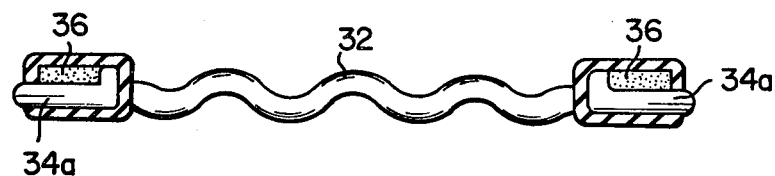

ANTISKID DEVICE FOR TIRE

BACKGROUND OF THE INVENTION

This invention relates to an antiskid device for tires and its fittings.

A tire chain system for preventing skidding of a tire is known and provided for in Japanese Industrial Standards (JISD 4241).

A tire chain system for preventing skidding of a tire comprises a side chain, a cross chain, an end link, a connector, a hook and a stopper.

The tire chain system of the aforesaid construction for preventing skidding of a tire is formed primarily to admirably serve the purpose of preventing tire skidding. However, when the tire chain system for preventing tire skidding is in service, it is important for practical purposes that it can be readily attached to a tire and removed therefrom and it has a long service life. However, the tire chain systems of the prior art used for the aforesaid purpose have suffered the disadvantages that difficulties are experienced in attaching and detaching the system and it has a rather limited service life.

This invention has been developed for the purpose of obviating the aforesaid disadvantages of the prior art. Accordingly, the invention has at its object the provision of a tire chain system that can be readily attached to and removed from a tire and has a prolonged service life.

Other and additional objects, features and advantages of the invention will become evident from the description of preferred embodiments set forth hereinafter when considered in conjunction with the accompanying drawings.

BRIEF DESCRIPTION OF THE DRAWINGS

FIG. 1b is a side view of the tire chain system shown in FIG. 1a;

FIG. 3b is a plan view of the cross link and the connector shown in FIG. 3a;

FIG. 3c is a side view of the cross link and the connector shown in FIG. 3a;

FIG. 3d is a fragmentary front view of the tire chain system shown in FIG. 1, shown as being mounted on a tire;

FIG. 4a' shows a modification of the stopper shown in FIG. 4a;

FIG. 4b is a side view of the tire chain system shown in FIG. 4a;

FIG. 4c is a front view of a modification of the connector shown in FIG. 4a;

FIG. 4d is a side view of the connector shown in FIG. 4a;

FIG. 4e is a front view of still another modification of the connector shown in FIG. 4a;

FIG. 4f1 is a side view of the connector shown in FIG. 4e;

FIG. 4g is a plan view showing only the hook, the end link and the stopper of the tire chain system in FIG. 4a;

FIG. 4g' shows a modification of the stopper shown in FIG. 4g;

FIG. 4h is a side view of the hook and the stopper of the tire chain system shown in FIG. 4a;

FIG. 4h' shows still another modification of the stopper shown in FIG. 4a;

FIG. 4i is a front view of the hook of the tire chain system shown in FIG. 4a;

FIG. 5b is a side view of the tire chain system shown in FIG. 5a;

FIG. 5c is a front view of a modification of the connector shown in FIG. 5a;

FIG. 5e is a side view of the stopper shown in FIG. 5a;

FIG. 6b is a side view of the cross link shown in FIG. 6a;

FIG. 7b being a plan view of the shoe and the connector shown in FIG. 7a; FIG. 7c being a bottom plan view of the shoe and the connector shown in FIG. 7b, FIG. 7d being a side view of the shoe and the connector shown in FIG. 7a, and FIG. 7e being a side view of a tire having the tire chain system shown in FIG. 7a being mounted thereon;

FIG. 8b being a plan view of the shoe and the connector shown in FIG. 8a, FIG. 8c being a bottom plan view of the shoe and the connector shown in FIG. 8b, FIG. 8d being a side view of the shoe and the connector shown in FIG. 8a, FIG. 8e being a fragmentary side view of the shoe, the connector, the shackle and the side chain and FIG. 8f being a side view of a tire having the tire chain system shown in FIG. 8a mounted thereon;

FIG. 11a is a front view of the tire skid preventing device comprising an eighth embodiment of the invention;

FIG. 11b is a plan view of the tire skid preventing device shown in FIG. 11a;

FIG. 11c is a side view of the tire skid preventing device shown in FIG. 11a;

FIG. 12 is a front view of a modification of the embodiment shown in FIGS. 11a-11c, involving only a minor change therein;

FIG. 13b is a plan view of the tire skid preventing device shown in FIG. 13a;

FIG. 13c is a right side view of the embodiment shown in FIG. 13a;

FIG. 13d is a left side view of the embodiment shown in FIG. 13a;

FIG. 15a is a front view of a tenth embodiment of the tire skid preventing device in conformity with the invention;

FIG. 15b is a plan view of the embodiment shown in FIG. 15a;

FIG. 15c is a right view of the embodiment shown in FIG. 15a;

FIG. 15d is a left side view of the embodiment shown in FIG. 15a; and

FIG. 16b is a plan view of the modification shown in FIG. 16a;

FIG. 16c is a side view of the modification shown in FIG. 16a;

FIG. 17a is a front view of the double type tire skid preventing device comprising an eleventh embodiment of the invention;

FIG. 17b is a plan view of the double type tire skid preventing device shown in FIG. 17a; and FIG. 17c is a side view of a double type tire skidding preventing device shown in FIG. 17a.

FIGS. 18a-18c show other antiskid device.

FIG. 19c shows the same process of fitting of hook by means of ring and thin wire connected thereto, FIG. 19f shows the same process of loosening of hook by means of ring and thin wire connected thereto.

DETAILED DESCRIPTION OF THE PREFERRED EMBODIMENTS

Figure 1A:
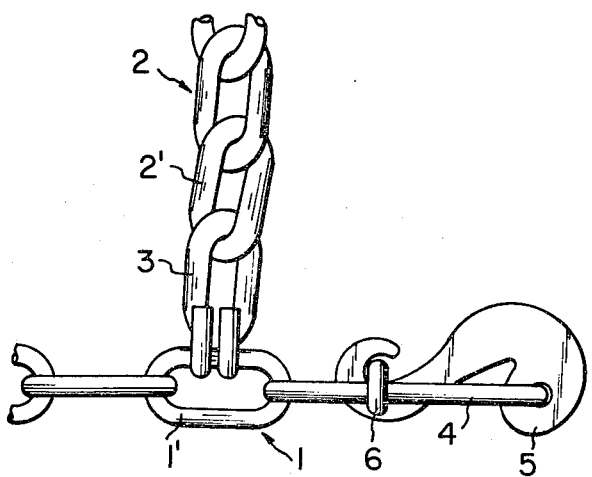
FIG. 1a is a front view of a tire chain system of the prior art for preventing tire skidding, showing one portion thereof.

Before describing the invention in detail by referring to its embodiments shown in the accompanying drawings, a tire chain system of the prior art will be outlined by referring to FIGS. 1a-1d. As shown, the tire chain system comprises a side chain 1, a cross chain 2, a connector 3, an end link 4, a hook 5 and a stopper 6.

Figure 1B:
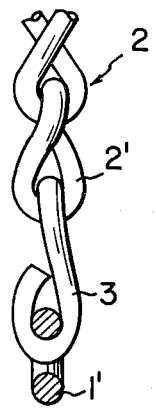

The cross chain 2 includes cross links 2' twisted through about 90 degrees on opposite two ends, as shown in FIG. 1b. The connectors 3 located at one end of the cross chain 2 and hooked one of the side links 1' of the side chain 1. In this construction, an end portion of the connector 3 is bent and a bent portion is located outside the connector body, so that the tire chain system has an upper side and an underside and does not lend itself to use by reversing its sides because of possible damage that the tire will suffer when the underside of the tire chain system is in contact therewith.

Figure 1C:
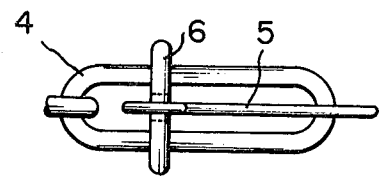
FIG. 1c is a plan view of the tire chain system shown in FIG. 1a, only showing the hook thereof.
Figure 1D:
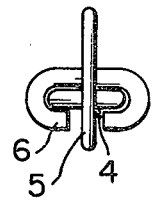
FIG. 1d is a side view of the tire chain system shown in FIG. 1a, only showing the hook thereof.

The side chain 1 is connected at its end to the end link 4 with which the stopper 6 in the form of a letter C open at one end is in engagement in straddling relation for sliding movement. The end link 4 has pivotally connected to its free end the hook 5 which is in engagement with the side link 1' at the other end of the side chain 1, so that the hook 5 itself is engaged by the stopper 6 as shown in FIG. 1c.

In this tire chain system of the prior art, the stopper 6 is movable along the end link 4. This construction makes it necessary to grip the stopper 6 with one hand, when the hook 5 is attached to the side link 1' to connect same to the stopper 6, so as to manipulate the hook 5 with the other hand. Thus this system suffers the disadvantage that manipulation of the hook 5 requires the use of both hands. Because of this, it is necessary to use both hands when the tire chain system inside a tire is to be locked in position, and persons who are not experienced in this type of operation must put their heads or the upper half portions of their bodies under the vehicle body at the risk of soiling their clothes or heads.

In the system of the prior art, the stopper 6 has a length greater than the width of the end link 4, so that the tire chain system greatly extends outwardly of the surface of the tire in this section alone. This has given rise to various problems including the lack of intimate contact of the tire chain system with the surface of the tire, the risks of the tire chain system tending to catching against an obstacle on the road while the vehicle is travelling and this outwardly extending section of the tire chain system suffers wear earlier than other parts of the system when it is exposed to the tire tread.

FIGS. 2a-2d show a first embodiment of the tire chain system in conformity with the invention which has been developed for obviating the aforesaid disadvantages of the prior art.

1a is a side chain, 2a a rod-shaped cross chain, and 3a a connector. 4a is an end link, 5a a hook and 6a a stopper.

The side chain 1a comprises side links 1'a and a side link 1'a'. The side links 1'a are each in the form of a two-piece link including a large link and a small link integrally connected together, and the side link 1'a' is single link adjacent the end link 4a.

The hook 5 is substantially of the same shape as the corresponding part of the chain system of the prior art except that there is no curved portion at the forward end and the upper portion of the forward end is horizontal for pivotal engagement with a free end of the end link 4.

The other end of the side link 1'a' and the end link 4a are connected to the stopper 6a in such a manner that the side link 1'a' and the end link 4a are engaged in the same opening or separate openings formed in the end stopper 6a. The end stopper 6a angled in transverse cross section is formed with a transverse web 6'a which is positioned against the underside of the end link 4a of the elliptic form to prevent the stopper 6a from moving upwardly (clockwise) in swinging movement from the position shown in FIG. 2b.

The stopper 6a is formed with a groove 6"a for the hook 5a to be fitted therein. By inserting the hook 5a in the groove 6"a, the former is prevented from moving clockwise in swinging movement in FIG. 2b.

The position in which the side link 1'a supported by the hook 5a engages the hook 5a is displaced from the position in which the hook 5a is pivotally supported by the end link 4a, so that the hook 5a is prevented from being dislodged from the stopper 6a so long as a tension acts on the side chain 1a.

Figure 2A:
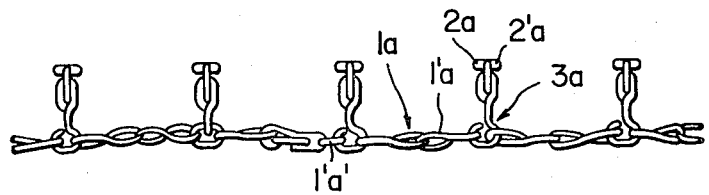
FIG. 2a is a front view of the tire chain system for preventing tire skidding comprising a first embodiment of the invention, showing a portion of the tire chain system.

As contrasted with the hook and the stopper of the tire chain system of the prior art, the hook and the stopper of the tire chain system of the aforesaid construction according to the invention can be readily manipulated with a single hand. This enables even an inexperienced man or a woman to readily mount the tire chain system on a tire. FIG. 2c shows the side link 1'a at the end of the side chain directed oppositely to the side link 1'a shown in FIG. 2b. This arrangement of the side link 1'a is provided when the length of the side chain 1a should be extended by the length of one link.

Figure 2B:
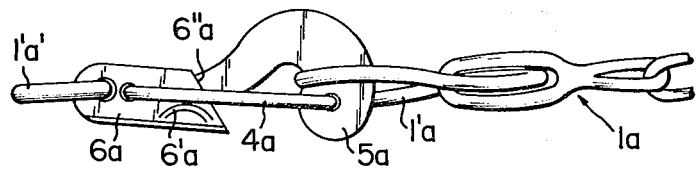
FIG. 2b is a front view of the tire chain system shown in FIG. 2a, showing the hook and the stopper on an enlarged scale.
Figure 2C:
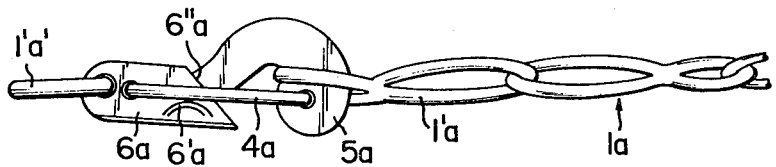
FIG. 2c is a front view of the tire chain system shown in FIG. 2a, showing the side chain in an extended position.
Figure 2D:
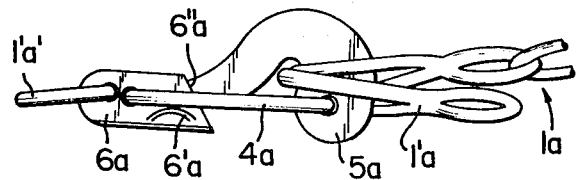
FIG. 2d is a front view of the tire chain system shown in FIG. 2a, showing the side chain in a shortened condition.

FIG. 2d shows the length of the side chain shortened by the length of one two-piece link as compared with the length of the side chain shown in FIG. 2b.

Figure 3A:
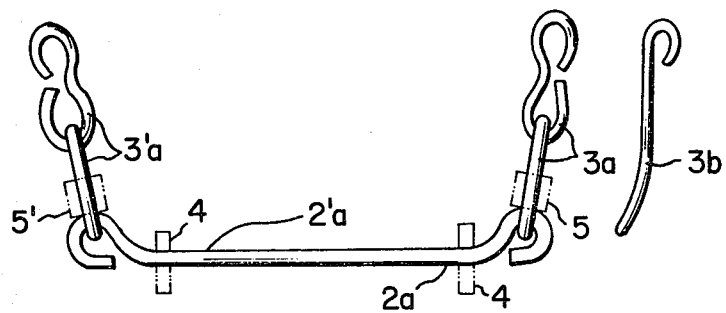
FIG. 3a is a front view showing the cross link and the connector according to the invention in an assembled condition.
Figure 3B:
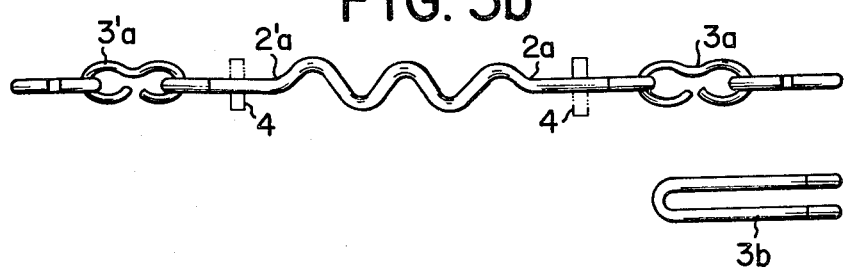
Figures 3C, 3D:
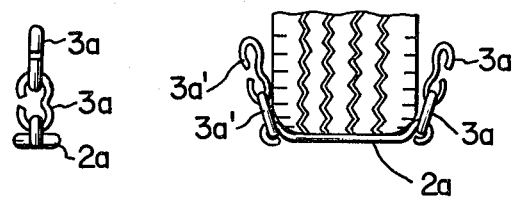

In FIG. 2a, the connector 3a is connected at one end to the side link 1'a of the side chain 1a and at the other end to a cross link 2'a of the cross chain 2a. As shown in FIGS. 3a-3d, the cross chain 2a is shaped as the single cross link 2'a in the form of a rod which has a tread bent in zigzag fashion in one place as shown in FIG. 3b for mounting on a tire. When the wheel having the tire chain system mounted on a tire thereof is positioned against the road surface, two angled portions 2'a' projecting into the tire surface bite into the tire to minimize displacement of the tire chain system on the tire which might be caused to occur by frictional dragging of the tire chain system on the road surface.

As compared with the cross chain 2 of the prior art, the cross chain of the construction shown in FIGS. 3a-3d minimizes friction of the vehicle body which would be caused by the road surface hardened with ice or snow and prevents the tire from skidding sideways. Thus the use of the cross chain 2a improves the riders' comfort and reduces noise. 3a is a connector, 3b is a modification of the connector, 4 is a damper cushion ring consisting of rubber and 5' is a damper cushion consisting of rubber.

FIGS. 4a-4i show a second embodiment of the tire chain system in conformity with the invention. 1b is a side chain, and 2b a cross chain, 3b, 3b' and 3b" are connectors. 4b is an end link, 5b a hook and 6b a stopper. The side chain 1b is in the form of a ring link 1'b twisted in such a manner that its opposite ends are angled at 90 degrees or less relative to each other. Only a side link 1'b' connected to the stopper 6b is twisted on its opposite ends through 90 degrees or more.

Figure 4A:
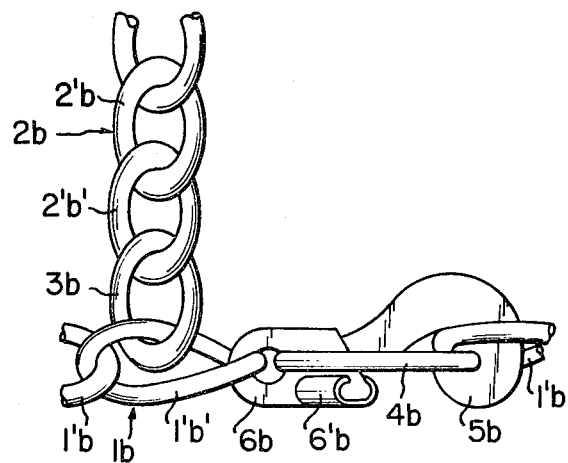
FIG. 4a is a front view of the tire chain system for preventing tire skidding comprising a second embodiment of the invention.
Figure 4A:
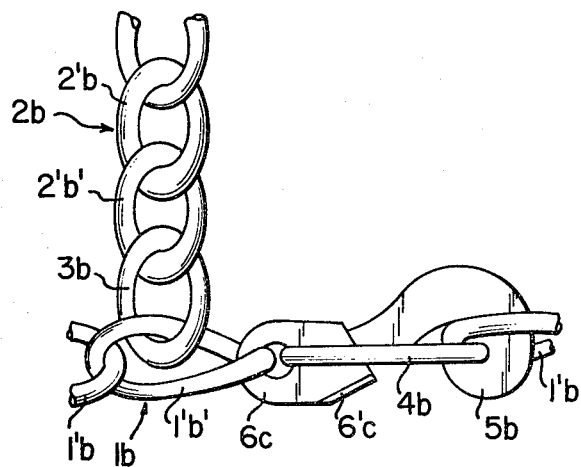

The cross chain 2b includes two types. One type is a cross link 2'b which is a ring link having two rings connected together and twisted in such a manner that its opposite ends are angled at 90 degrees or less relative to each other. and the other type is a cross link 2'b' adjacent the connector 3b which is twisted to have its opposite ends angled at 90 degrees or more relative to each other. FIG. 4a' shows a modification of the stopper shown in FIG. 4a. The connector 3b is an elliptic, twisted link. The connector 3b' shown in FIGS. 4c and 4d is separated at one end of the ring, and the end portions of the connector 3b' extend in the same direction through the side ring 1'b and enter the opening of the connector itself. The connector 3b" shown in FIGS. 4e and 4f is also separated at one end of the ring but the ends of the connector 3b" extends in opposite directions through the side ring 1'b before entering the opening of the connector itself.

By virtue of this construction, the connectors 3b, 3b' and 3b" are of the same shape on opposite sides and can be used on either side thereof without damaging the tire. This makes it possible to use the tire chain system by reversing its position when wear is caused on the cross chain, thereby prolonging the service life of the tire chain system. The cross chains 2b, 2c and 2d each include two rings connected together, and this construction brings a portion of the cross chain contacting the road surface into contact with the tread of a tire at an angle of about 45 degrees, thereby minimizing skidding of the tire sideways.

Figure 4G:
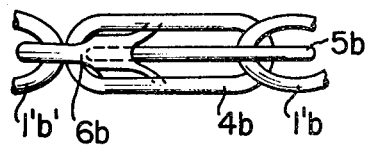
Figure 4G:
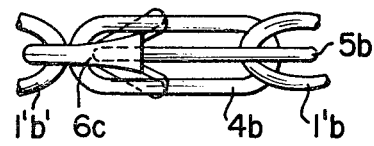
Figure 4H:
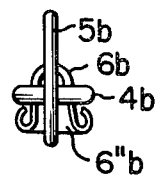
Figure 4H:
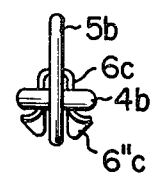
Figure 4I:
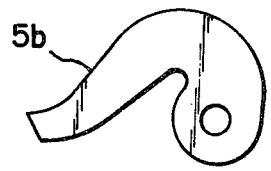

The tire chain system according to the invention composed of the stoppers 6a, 6b, 6c and 6e, the side chains 1a and 1b, the connectors 3a, 3b, 3b' and 3b" and the cross chains 2a, 2b, 2c and 2d has a relatively small thickness when mounted on a tire as compared with a tire chain system of the prior art. In addition, it has a light weight and is easy to manipulate, so that the tire chain system according to the invention is convenient to use and low in cost. FIGS. 4g' and 4h' show a modification of the stopper shown in FIGS. 4g and 4h.

FIGS. 5a-5d show a third embodiment of the tire chain system in conformity with the invention. The tire chain system comprises a side chain 1c, a cross chain 2c, a connector 3c, and end link 4c, a hook 5c and a stopper 6c. The side chain 1c of this embodiment is in the form of a link having no twisting.

The cross chain 2c is in the form of a two-piece cross link 2'c which is twisted in such a manner that its opposite ends are angled at below 90 degrees relative to each other. The connector 3c which is also angled in such a manner that its opposite ends are angled at 90 degrees or more relative to each other is connected to the side link 1'c, as shown in FIGS. 5a and 5b.

Figure 5A:
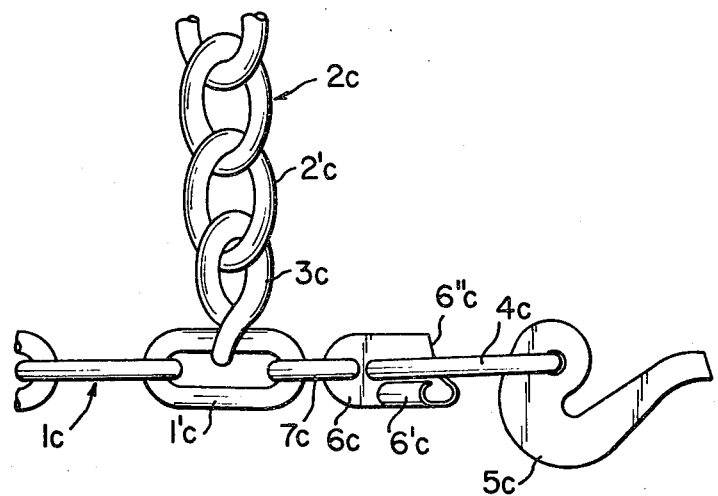
FIG. 5a is a front view of the tire chain system for preventing tire skidding comprising a third embodiment.
Figure 5B:
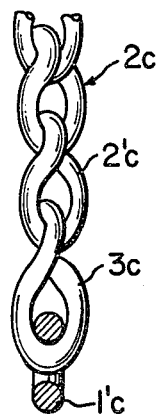
Figure 5C:
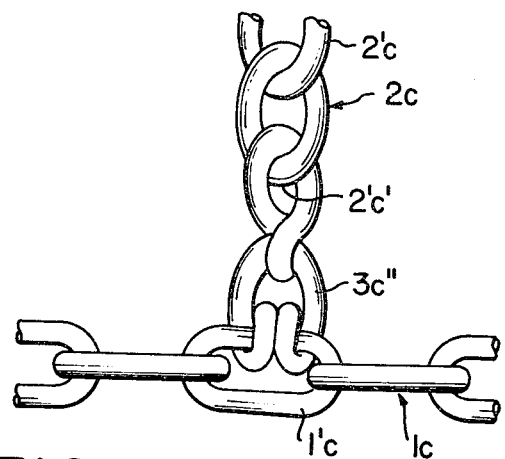
Figure 5D:
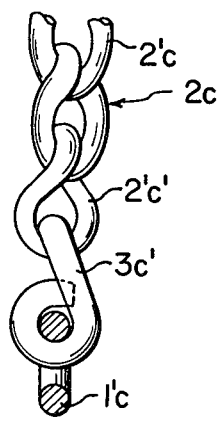
FIG. 5d is a side view of the connector shown in FIG. 5c.
Figure 5E:
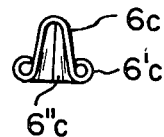
Figure 6A:
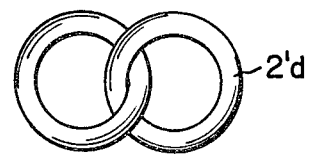
FIG. 6a is a plan view of the cross link formed in two pieces in a circular shape according to the invention.
Figure 6B:
Figure 6C:
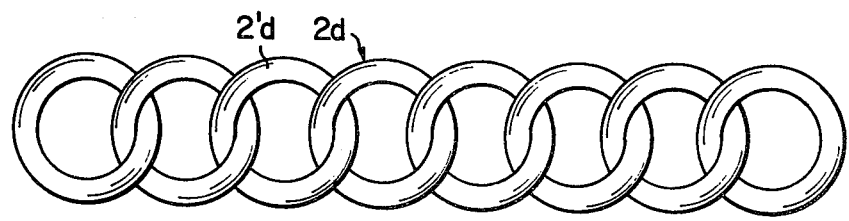
FIG. 6c is a plan view of the cross links formed in two pieces, shown in a condition in which they are connected together.
Figure 6D:
FIG. 6d is a side view of the cross links shown in FIG. 6c.
Figure 7A:
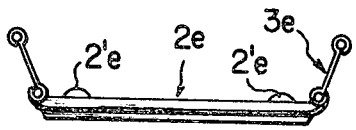
FIGS. 7a–7e show a fourth embodiment of the tire chain system for preventing tire skidding in conformity with the invention, FIG. 7a being a front view of the shoe and the connector.
Figure 7B:
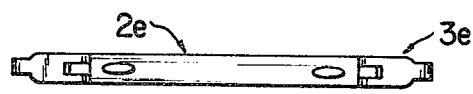
Figure 7C:
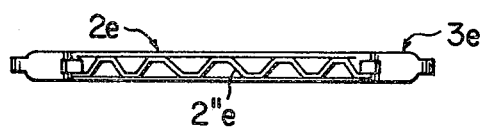
Figure 7D:
Figure 7E:
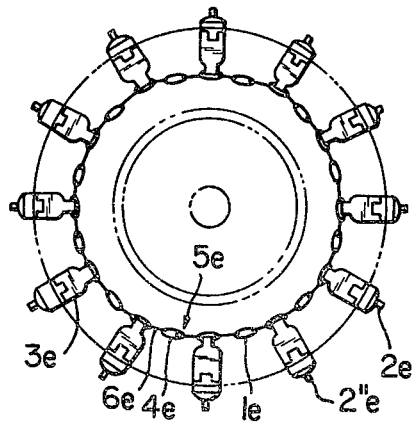
Figure 8A:
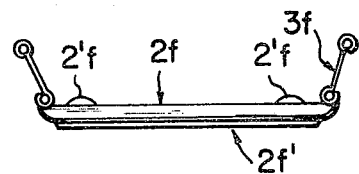
FIGS. 8a–8f show a fifth embodiment of the tire chain system for preventing tire skidding in conformity with the invention, FIG. 8a being a front view of the shoe and the connector.
Figure 8B:
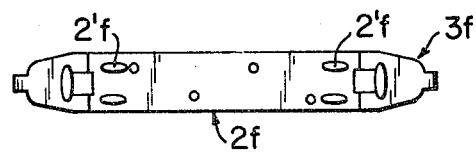
Figure 8C:
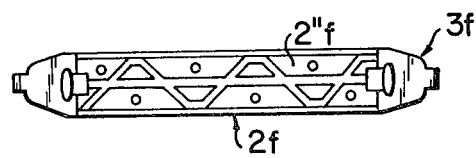
Figure 8D:
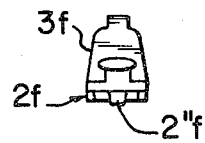
Figure 8E:
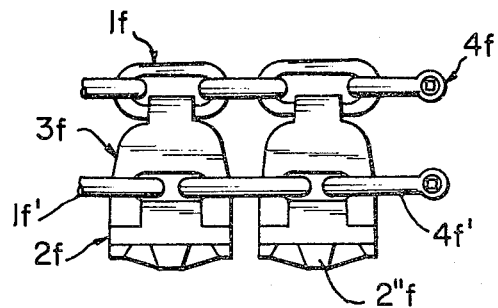
Figure 8F:
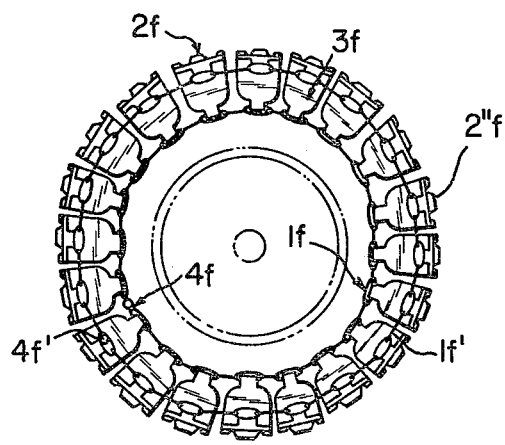
Figure 9A:
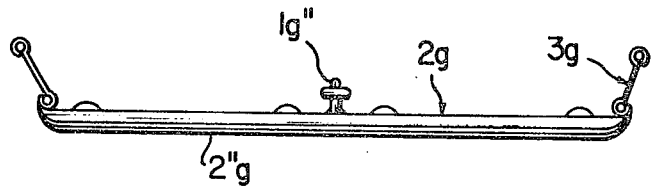
FIGS. 9a-9d show a sixth embodiment of the tire chain system for preventing tire skidding in conformity with the invention, FIG. 9a being a front view of the shoe and the connector, FIG. 9b being a plan view of the shoe and the connector shown in FIG. 9a, FIG. 9c being a bottom plan view of the shoe and the connector shown in FIG. 9b and FIG. 9d being a side view showing the shoe and the connector in connected condition, showing a portion thereof.
Figure 9B:
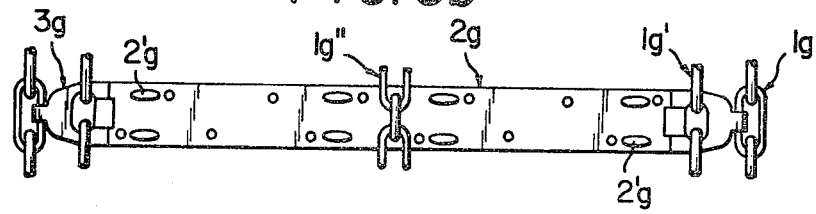
Figure 9C:
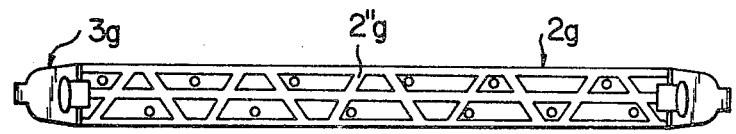
Figure 9D:
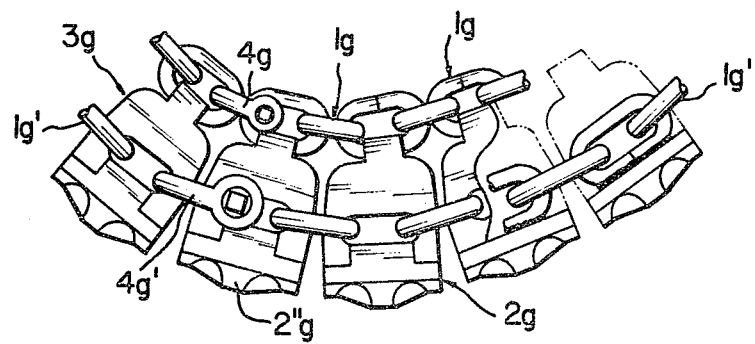

The tire chain system shown in FIGS. 5c and 5d is distinct from the tire chain system shown in FIGS. 5a and 5b in that the connector 3c" and the side link 2'c' adjacent the connector 3c" are different from the connector 3c and the side link 2'c. The connector 3c" is broken at one end and its end portions enter the opening of the side link 1'c from the same side and extend therethrough so that they enter the opening of the connector 3c" itself to be connected to each other.

An additional link 7c is connected, as shown in FIG. 5a, to the side link 1'c at one end thereof, and the stopper 6c and the end link 4c engage the additional link 7c through the same opening or separate openings formed in the additional link 7c. The stopper 6c is of the same shape as the stopper shown in FIGS. 4a–4c. More specifically, the stopper 6c which is angled in transverse cross section is formed with a transverse web 6'c positioned against two legs of the end link 4c, and a groove 6"c for the hook 5c to be engaged in. The end link 4c has a free end constructed such that the hook 5c can be engaged in the groove 6"c while the hook 5c is connected to the other end of the side link 1'c constituting the side chain 1c.

FIGS. 6a–6d illustrate a cross link and a cross chain in the form of two-piece ring link. 2d is a cross chain, and 2'd a cross link.

FIGS. 7a–7e show a device for preventing skidding of a tire distinct from the tire chain system used as a tire skidding preventing system shown and described hereinabove by referring to several embodiments. The tire skidding preventing device shown in FIGS. 7a–7e comprises a shoe 2e of elongated steel used in place of the cross chain, a connector 3e of the flat shape, a side chain 1e, a stopper 6e, a hook 5e and an end link 4e. The tire skidding preventing device of this construction can be readily mounted on a tire and removed therefrom and better serves the intended purpose than tire chain system of the prior art when used on muddy or wet lands in inclement weather, a condition one often encounters in clearing the forests and reclaiming land. 2'e indicates angled projections on the tire side and 2"e ribs arranged in zigzag fashion on the tread side.

FIGS. 8a–8f show a device for preventing skidding of a tire distinct from the device shown in FIGS. 7a–7e in that it has a larger width and a heavier weight although the shoe 2e and the connector 3e are of the same shape. In this system, the side chains 1f and 1f are arranged in two rows on one side to connect the shoes 2f together.

The shoe 2f is constructed such that when wear is caused on skidding preventing teeth 2"f on its underside and they become unusable, they can be replaced by new ones. The shoe 2f is formed with a plurality of angled projections 2'f on the tire side, and the system can serve the purpose of protecting tire as well as preventing tire skidding because the shoe 2f and the connector 3f have a large width. Thus this system has particular utility for use as a tire protector for vehicle assigned to a work involving wear and damage to tires, such as a quarry, a mine, a cement plant, a garbage disposal system, a glass plant, a dam building site, etc.

FIGS. 9a–9d show a device for preventing skidding of a tire substantially of the same shape as the device shown in FIGS. 8a–8f but the two devices are distinct from each other in that the device shown in FIGS. 9a–9d has a shoe 2g almost twice as long as the shoe 2f because the device is for a double tire. To this end, the shoe 2g has a center chain 1g" in the central portion, and two angled projections on opposite sides, to device the system to be used in the same manner as the device shown in FIGS. 8a–8f. The shoe 2g is formed with skidding preventing teeth 2'g which are interchangeable as are the teeth 2"f. The device shown in FIGS. 9a–9d can be used, as shown in FIG. 10d, with a vehicle having four rear wheels in such a manner that one tire skidding preventing device is mounted on the two rear wheels on either side of the vehicle. This enables the vehicle to travel safe on muddy or wet ground or in inclement weather.

Figure 10A:
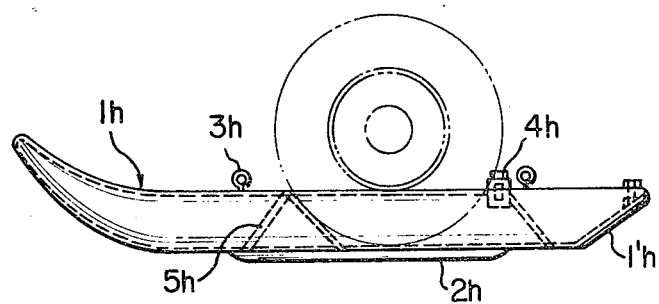
FIGS. 10a-10c show a seventh embodiment of the skid preventing device (for a snow boat), FIG. 10a being a side view of the boat type skid preventing device, FIG. 10b being a plan view of the boat type skid preventing device shown in FIG. 10a, FIG. 10c being a rear view of the boat type skid preventing device and FIG. 10d being a side view of the skid preventing devices shown in FIGS. 9 and 10, shown as being mounted on a vehicle.
Figure 10B:
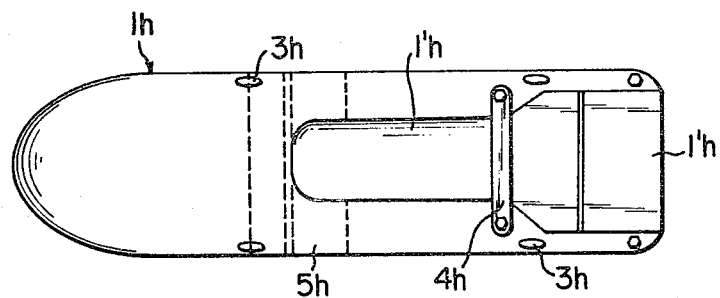
Figure 10C:
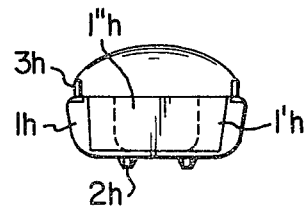
Figure 10D:
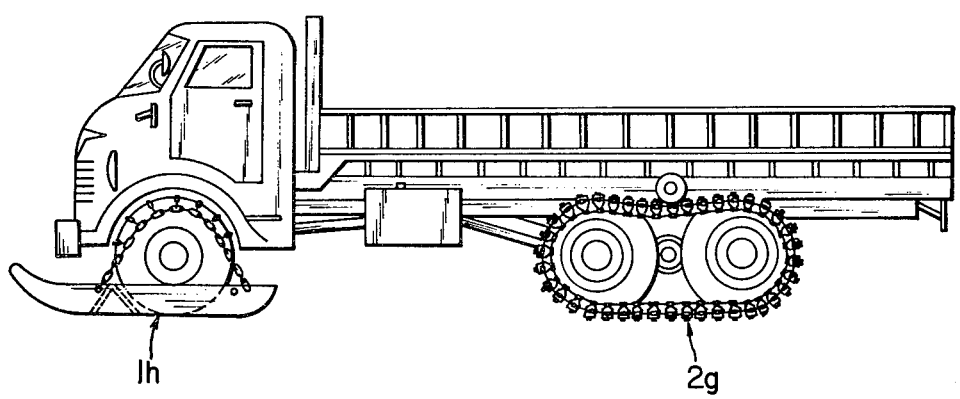
Figure 13A:
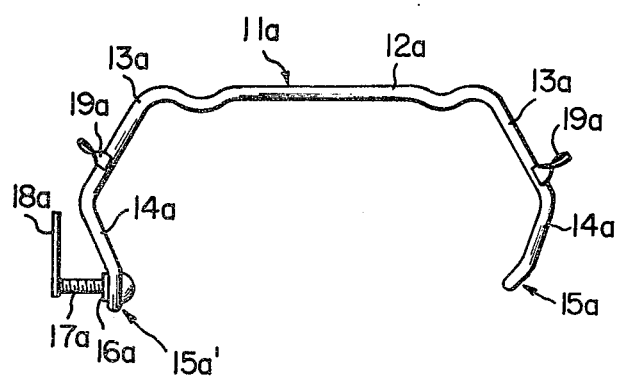
FIG. 13a is a front view of a ninth embodiment of the tire skid preventing device in conformity with the invention.
Figure 13B:
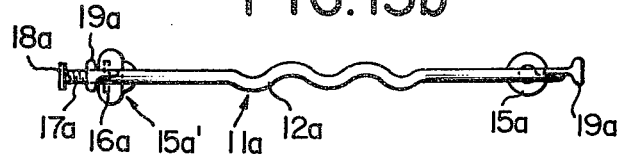
Figure 13C:
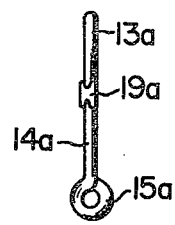
Figure 13D:
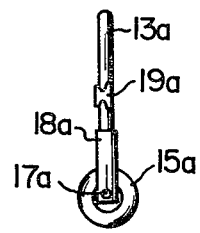

FIGS. 10a–10c show a device for preventing sideways tire skidding of the snow boat type. This device is exclusively for use with front wheels of a vehicle and comprises a body 1h, a shoe 2h, an anchor 3h, a stopper rod 4h, a stopper plate 5h, a door 1'h and a tire guide groove 1"h. When a tire is let in or out, the door 1'h opens downwardly. The anchor 3h serves as an anchor bolt for fixing a chain for connecting the tire to the body 1h, and the stopper rod 4h and the stopper plate 5h prevent the tire from moving back and forth. The guide groove 1"h is wide at its inlet to enable the tire to be readily get therethrough and compact in the rearward portion to enable the tire to be intimately held therein. The body 1h has attached to its underside a plurality of shoes 2h (two in the embodiment shown) extending longitudinally of the body 1h in a position immediately below the tire in the central portion of the body 1h, to thereby prevent sideways skidding of the tire.

By mounting the snow boat type tire sideways skidding preventing device on a tire as shown in FIG. 10d, it is possible to enable a vehicle to travel with ease on a road from which snow is not cleared, on muddy or wet lands or in the fields and forests. The snow boat type device can be readily mounted on a tire and removed therefrom without causing any trouble.

In the embodiments of the tire skidding preventing device shown and described hereinabove, it is possible to readily connect the hook 5a, 5b, 5c, 5e to the stopper 6a, 6b, 6c, 6e with one hand while holding the side chain 1a, 1b, 1c, 1e with the other hand.

When the side chain 1a is in the form of a side link 1'a of the two-piece link type, the device offers the advantage that one only has to reverse the direction of the side link 1'a when it is desired to reduce the length of the chain system by one or two links. Also, when the system is mounted on a tire, the trouble of the links getting tangled with each other is avoided, thereby eliminating the need for the device to be in alignment with the tire.

The tire chain system comprising the side chain, cross chain, connector, stopper, end link and hook of the aforesaid construction according to the invention is smaller in thickness and lighter in weight than corresponding chain systems of the prior art, and can be used on both sides without damaging the tire. The system has a prolonged service life and can be readily mounted on a tire and removed therefrom, irrespective of whether the tire is attached to a front wheel or a rear wheel.

The embodiments of the tire skidding preventing device shown in FIGS. 7-10 have a substantially longer service life than devices of the prior art and are economical because the shoes can be replaced by new ones when wear is caused on them. The devices can be readily mounted on and removed from tires.

FIGS. 11a–11c show an eighth embodiment of the invention in which a main body 11 of the tire skidding preventing device serving as a tire chain mounting member is substantially in the form of a letter U. The main body 11 includes a tread portion 12 in corrugation form located in a position corresponding to the tread of a tire when the device is attached to the tire for mounting the tire chain system therein, as shown in FIG. 11a. The tread portion 12 is formed with elevations and depressions widthwise thereof, so that the elevations and the depressions form convex and concave surfaces respectively. Thus the tread portion 12 is not in the same plane.

13 indicates portions corresponding to the shoulders of a tire at which the main body 11 is bent inwardly to form side wall portions 14 corresponding to the side walls of the tire. The tread portion 12 and the shoulder portions 13 form obtuse inner angles and the shoulder portions 13 and the side wall portions 14 also form obtuse inner angles. One of the side wall portions 14 is contiguous with a coiled portion 15 in triangular or annular form and the other side wall portion 14 is contiguous with a straight portion which has a nut 16 welded thereto and has a round-headed bolt 17 threadably inserted therein from inside the side wall portion 14. A handle 18 is secured to the bolt 17 from outside.

An L-shaped metal stop member 19 is secured to either one of the shoulder portions 13 at the outer surface and has a neck portion 20 of reduced width for hitching the link of the chain thereon.

When the main body 11 of the tire skidding preventing device has no metal stop members 19, the device can be used exclusively for extricating a vehicle stuck in a deep snow pile, for example.

The embodiment shown in FIG. 12 is similar to the embodiment shown in FIG. 11 except that the two side wall portions 14 are each provided with a coiled portion 15 in triangular or annular form in the former. This embodiment lacks the bolt 17 for threadably engaging the nut 16 to secure the system to the side of the tire, so that the force with which the device is secured to the tire at the side wall thereof is slightly reduced. However, this embodiment is convenient when the mounting of a tire chain system is urgently required or when it is urgently necessary to extricate a vehicle from a deep snow pile, for example.

FIGS. 13a–13d are a ninth embodiment in which the main body 11a of the tire skidding preventing device serving as a tire chain system mounting member is formed of bar material.

A portion 12a of the main body 11a corresponding to the tread of a tire when the device is attached thereto extends widthwise of the tire while zigzagging peripherally thereof. Contiguous with the tread portion 12a and extending from opposite ends thereof are shoulder portions 13a corresponding to the shoulders of the tire which are bent inwardly to cooperate with the tread portion 12a to form obtuse inner angles. Side wall portions 14a corresponding to the side walls of the tire are contiguous with the shoulder portions 13 and cooperate therewith to form obtuse inner angles. One of the side wall portions 14a has an end portion which is coiled annularly to avoid damage to the tire by pressing thereagainst and the other side wall portion 14a has an end portion which is also coiled as indicated at 15a' having a hexagonal nut 16a welded thereto for threadably receiving a round-headed bolt 17a inserted therein from inside the side wall portion 14a. A handle 18a is welded to the end of the bolt 17a. A metal stop member 19a is secured to either of the shoulder portions 13a at the outer side and twisted through about 90 degrees with respect to the weld portion on the shoulder portions 13a. Each metal stopper member 19a is formed with a neck 20a by reducing the width of the member 19a for hitching the side chain of the tire chain system thereon. The device having no metal stop members 19a is used exclusively for extricating a vehicle from a deep snow pile, for example.

Figure 14A:
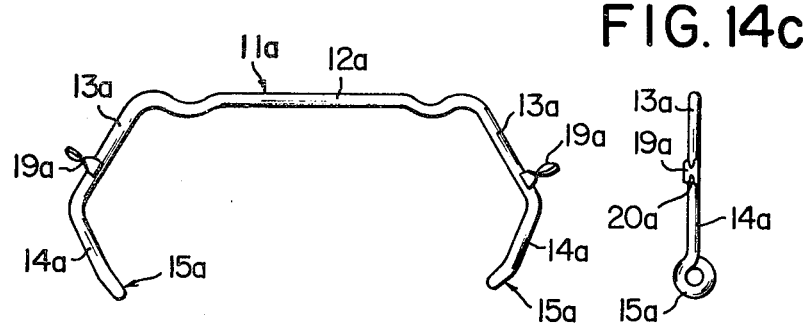
FIGS. 14a-14c are front views showing a modification of the embodiment shown in FIGS. 13a-13d, involving only a minor change therein.
Figure 14C:
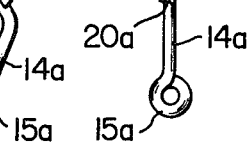
Figure 14B:
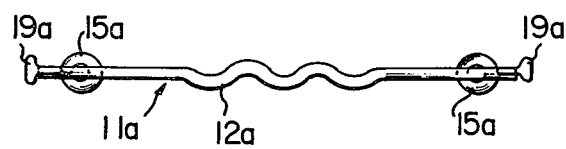
Figure 16A:
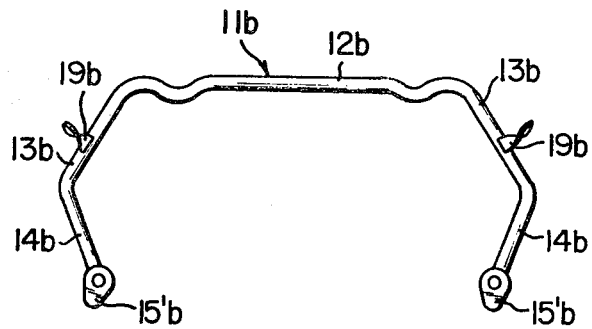
FIG. 16a is a front view of a modification of the embodiment shown in FIGS. 15a-15d, involving only a minor change therein.
Figure 16C:
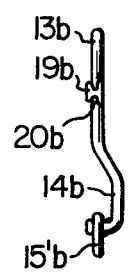
Figure 16B:
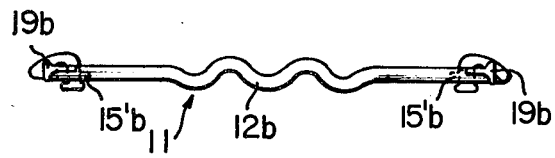
Figure 19A:
FIGS. 19a-19c show process of fitting of hook by one hand, especially
Figure 19B:
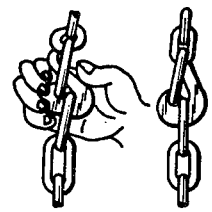
Figure 19C:
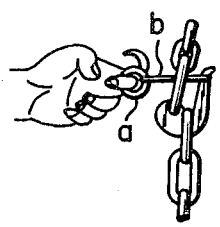
Figure 19D:
FIGS. 19d-19f show process of loosening of hook, especially
Figure 19E:
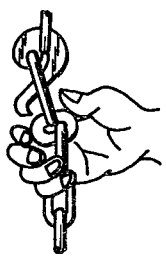
Figure 19F:
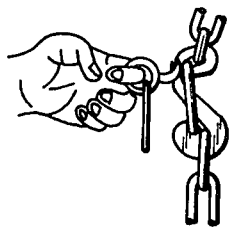

FIGS. 14a–14c show another embodiment which is similar to the embodiment shown in FIGS. 13a–13d in that the side wall portions 14a are similar in shape and have the coiled portions 15a except that the former has no nut secured to the coiled portion 15a. Thus the lack of the bolt 17a for securing the device to the tire reduces the force with which the device is secured to the side wall portion of the tire. However, the embodiment shown in FIGS. 14a–14c in convenient when it is urgently required to mount the tire chain system on a tire or to remove the system from the tire because handling of the system is simplified.

FIGS. 15a–15d show a tenth embodiment of the invention in which a main body 11b of the antiskid device for a tire or a tire chain system mounting member is in elongated bar form and includes a tread portion 12b constructed such that when the main body 11b is mounted on a tire, the tread portion 12b extends widthwise of the tire vehicle zigzagging peripherally thereof. Thus when the wheel rotates with the antiskid device being mounted on its tire and the tread portion 12b of the main body 11b is brought into contact with the road surface, angled portions of the tread portion 12b catch against the road surface and increase the force with which the tire grips the road and travels thereon.

The main body 11b comprises shoulder portions 13b formed by bending the tread portion 12b at its opposite ends to conform to the shoulder portions of the tire in shape. When the shoulder portions 13b are formed by bending the tread portion 12b, the shoulder portions 13b are slightly bent in a radial direction and a right-angle direction (FIGS. 15c and 15d) so that each shoulder portion 13b cooperates with the tread portion 12b to form an obtuse inner angle. Each shoulder portion 13b is bent inwardly to provide a side wall portion 14b.

One of the side wall portions 14b is bent at a right angle at its end portion and has a disc 15'b pivotally supported on the bent end portion to prevent damage that might be caused on the tire when the side wall portion 14b is positioned against the side wall of the tire. The disc 15'b may be either annular or elliptic.

The other side wall portion 14b has welded thereto near its end a nut 16b having threaded therein from inside wall portion 14b a round-headed bolt 17b to which a handle 18b is secured at the end.

Each of the shoulder portions 13b has a metal stop portion 19b secured thereto. The metal stop member 19b is in strip form which is twisted through about 90 degrees in a portion contiguous with a seat at which it is secured to the shoulder portion 13b and then has its width reduced to form a neck 20b. When the main body 11b of the antiskid device has no metal stop members 19b, the antiskid device is exclusively used for extricating a vehicle from a deep snow pile, for example.

FIGS. 16a–16d show a modification of the embodiment shown in FIGS. 15a–15d. The former is distinct from the latter in that the two side wall portions 14b of the main body 11b each have the disc 15b and no bolt 17b is used. In other respects, the two embodiments are similar in construction. The embodiment shown in FIGS. 16a–16d is lower in the force with which the device is secured to the side of a tire than the embodiment shown in FIGS. 15a–15d. However, the former is convenient and advantageous when it is necessary to urgently mount a tire chain system on the tire or urgently remove the tire chain system from the tire.

FIGS. 17a–17c show an antiskid device for a tire suitable for mounting a tire chain system of the double tire type which serves as a tire chain mounting member and as a member for urgently removing the tire chain system from the tire.

22 indicates tread portions zigzagging peripherally of a tire while extending widthwise thereof when the device is mounted on the tire. The tread portions 22 are two in number and arranged in end-to-end relation corresponding to the double tire. Each of the tread portions 22 is bent at its end at an obtuse inner angle to form a shoulder portion 23 which is bent at an obtuse angle to form a side wall portion 24. Each side wall portion 24 is coiled at its end portion to provide a ring-shaped coiled portion 25 adapted to be positioned against one of the side walls of the tire.

In FIG. 17, a metal stop member 29' is secured to a portion intermediate between the two tread portions 22 which each have a metal stop member 29 secured thereto. The side chains of a tire chain system are hitched on the metal stop members 29 and 29' to securedly hold the system in place.

In FIGS. 18a-18c, 31 is skidding preventing device; 32, tread; 34, end portion; 34a, end projection; 35, jacket; 36, oil or grease, or other damper medium.

In FIGS. 19a-19f, a is ring; and b is a thin wire connected thereto for engaging the hook to the stopper.

According to the invention, the main body 11, 11a, 11b, 21 of the antiskid device for a tire serving as a mounting member for a tire chain system is mounted on a tire in a radial direction and the coiled portions at the end portions of the side wall portions 14, 14a, 14b, 24 grip the side walls of the tire by the resilient flexing of the side wall portions. When the bolt is used, the clamping force of the bolt is relied on to grip the tire.

When it is necessary to urgently remove a tire chain system from the tire or urgently mount one thereon, the device without a bolt is convenient and advantageous.

In the invention, the main body of the device is in bar form. This obviates the disadvantage of the prior art using a main body in strip form that when the tread portion of the main body is brought into contact with the surface of the road as the wheel rotates, the device attached to the tire is loosened or displaced. By using the device according to the invention, mounting of a tire chain system on a tire is facilitated. By using a plurality of antiskid devices for tires according to the invention, extrication of a vehicle stuck in a deep snow pile, for example, can be readily effected.

What is claimed is:

1. An antiskid device for a tire comprising a tread portion, a pair of shoulder portions and a pair of side wall portions formed of elongated plate material in one piece, said tread portion being corrugated in a radial direction of a tire on which the device is mounted, said tread portion and said shoulder portions and said shoulder portions and said side wall portions forming obtuse inner angles, said side wall portions each being formed with a coiled portion at its end, and said shoulder portions each being formed with a metal stop member for hitching a tire chain system thereon.

2. An antiskid device for a tire as claimed in claim 1, wherein said tread portion, said pair of shoulder portions and said pair of side wall portions are formed of bar material in place of the elongated plate material, and said tread portion extends widthwise of a tire on which the device is mounted while zigzagging peripherally thereof.

3. An antiskid device for a tire as claimed in claim 2, wherein one end portion substantially parallel to said tread portion is provided to one or both of said side wall portions, said end portion having a disc attached thereto in place of the coiled portion.

4. An antiskid device for a tire as claimed in any one of claims 1-3, wherein said tread portion is plural in number and two tread sections are arranged in end-to-end relation to accommodate a double tire.

5. An antiskid device for a tire comprising a side chain, a cross chain, a connector, an end link, a hook and a stopper, wherein said side chain comprises a plurality side links each formed as a two-piece link including two links, one a long link and the other a short link, which are integral with each other, said stopper being angled in transverse section and formed with a transverse web of a width large enough to contact a lower portion of said end link, and a groove of a width large enough to receive said hook, said cross chain being formed as a cross link of bar material, said connector being in the form of a link on either end and in the form of a rod in its intermediate portion so that the connector is connected at one end to said cross link and at the other end to said side link.

6. An antiskid device for a tire as claimed in claim 5, wherein said side chain comprises, in place of the side link formed as a two-piece link, side links each twisted at opposite ends through an angle below 90 degrees; said cross chain comprises a plurality of cross links each formed as a two-piece link having two links of the elliptic form twisted at opposite ends of the two links through 90 degrees or less and integral with each other; and said connector comprises a twisted link of the elliptic shape twisted at opposite ends through 90 degrees or more or broken at one end into two end portions extending through an opening of said side link in the same direction or in opposite directions before extending through an opening of the connector in the same direction or in opposite directions to be joined together.

7. An antiskid device for a tire as claimed in claim 5, wherein said cross chain comprises a plurality of shoes each formed of elongated steel and having angled projections on opposite ends on a side facing a tire and ribs arranged in zigzag fashion on a tread side; and said connector is formed of flat steel material connected at one end to said shoe at the other end to said side chain.

8. An antiskid device as claimed in claim 7, wherein the side chain comprises an upper side chain and a lower side chain for connecting the connector in two stages or above and below the connector, and said shoes are each formed with angled projections on a side facing the tire and antiskid teeth arranged in zigzag fashion on a tread side, said antiskid teeth being replaceable.

9. An antiskid device for a tire as claimed in claim 8, wherein said shoes each have a center chain extending circumferentially of the tire along the central portion of a side of the shoe facing the tire.

10. An antiskid device for a tire as claimed in claim 6 wherein said cross chain comprises a plurality of shoes each formed of elongated steel and having angled projections on opposite ends on a side facing a tire and ribs arranged in zigzag fashion on a tread side; and said connector is formed of flat steel material connected at one end to said shoe and at the other end to said side chain.

11. An antiskid device for a tire as claimed in claim 10 wherein the side chain comprises an upper side chain and a lower side chain for connecting the connector in two stages.

12. An antiskid device for a tire as claimed in any one of claims 5-9, 10, or 11 further comprising a body for preventing sideways skidding of the snow boat type, said body being exclusively for use with a tire of a front wheel of a vehicle.

* * * * *